No. 773,947. PATENTED NOV. 1, 1904.
A. LINDGREN.
SEEDING MACHINE.
APPLICATION FILED AUG. 27, 1904.
NO MODEL. 2 SHEETS—SHEET 1.

Witnesses

Inventor
August Lindgren
By P. T. Dodge
Attorney

No. 773,947. PATENTED NOV. 1, 1904.
A. LINDGREN.
SEEDING MACHINE.
APPLICATION FILED AUG. 27, 1904.
NO MODEL. 2 SHEETS—SHEET 2.
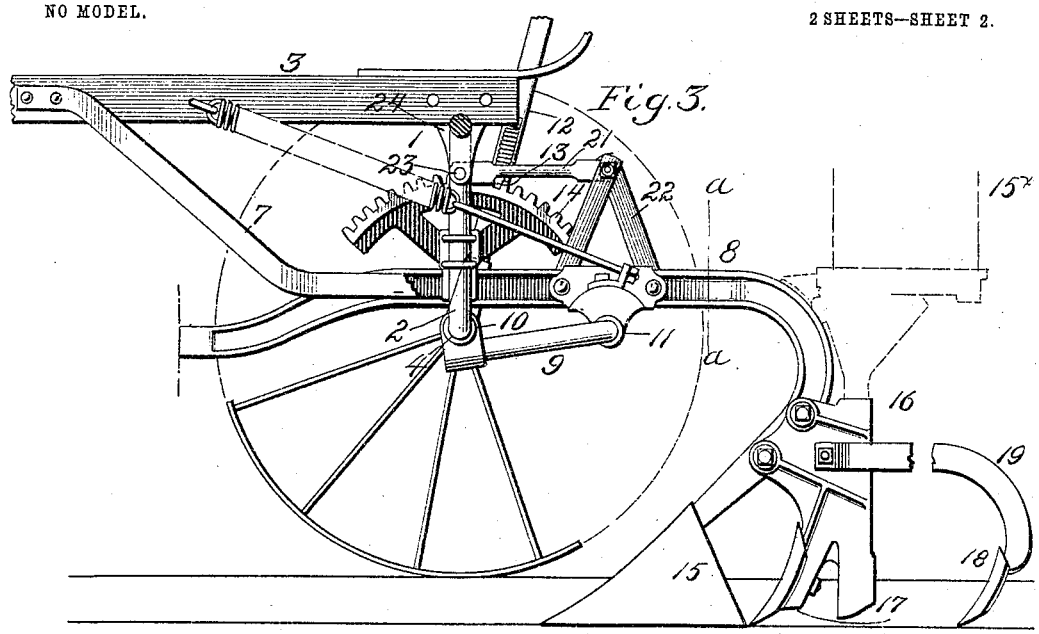
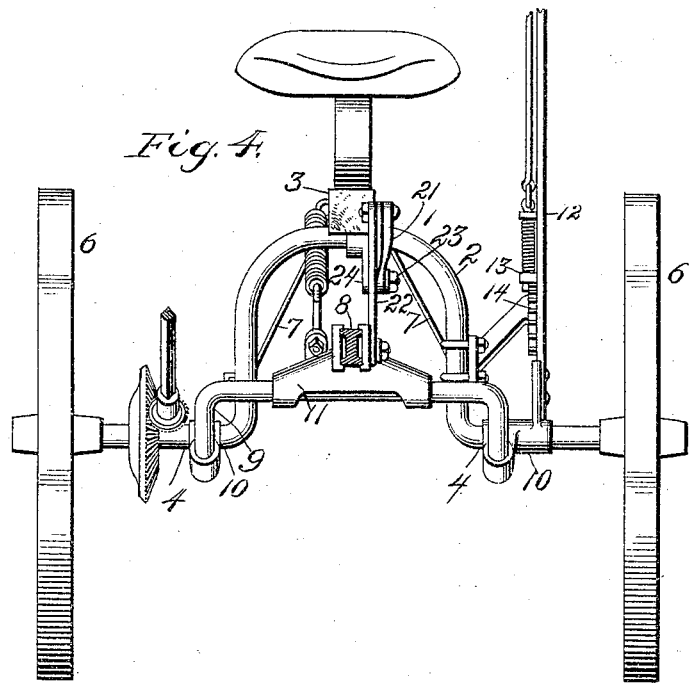
Witnesses
Inventor
August Lindgren
By P. T. Dodge
Attorney No. 773,947.

Patented November 1, 1904.

UNITED STATES PATENT OFFICE.

AUGUST LINDGREN, OF MOLINE, ILLINOIS, ASSIGNOR TO THE MOLINE PLOW COMPANY, A CORPORATION OF ILLINOIS.

SEEDING-MACHINE.

SPECIFICATION forming part of Letters Patent No. 773,947, dated November 1, 1904.

Application filed August 27, 1904. Serial No. 222,401. (No model.)

*To all whom it may concern:*

Be it known that I, AUGUST LINDGREN, of Moline, county of Rock Island, and State of Illinois, have invented a new and useful Improvement in Seeding-Machines, of which the following is a specification.

This invention has reference to machines for planting cotton, corn, and other seeds, and relates more particularly to the type of machine embodying a wheeled frame in which is mounted a vertically-adjustable beam equipped with furrow-opening devices, a seed-dropping mechanism, and covering devices. In the use of machines of this type, particularly in the planting of cotton-seed, it is sometimes desirable to deposit the seed on the top of a ridge with the ground-wheels running in the trench, while at other times the seed are planted in the trench with the wheels running on the top of the ridge, and at other times the seed are planted on a level. To adapt the machine for these different conditions requires a corresponding vertical adjustment of the beam, and it is essential to good work that under these adjustments the beam remain horizontal or on a level, so that the furrow-opener, the seed-spout, and the covering devices will work at the same depth.

My invention is directed to this end; and it consists in the combination, with means for raising and lowering the beam and holding it in the desired position, of a connection of improved form between the beam and the frame acting automatically to maintain the horizontal position of the beam or its level, notwithstanding the position of the parts vertically.

The invention consists also in the details of construction and combination of parts hereinafter described and claimed.

Figure 1:
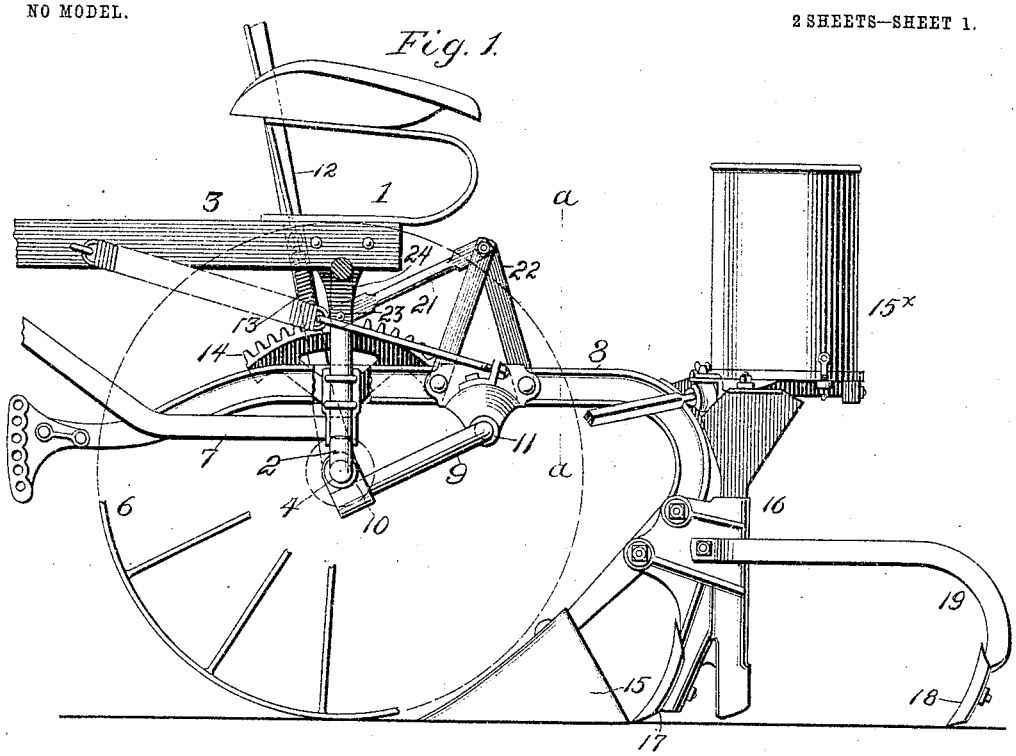
Figure 2:
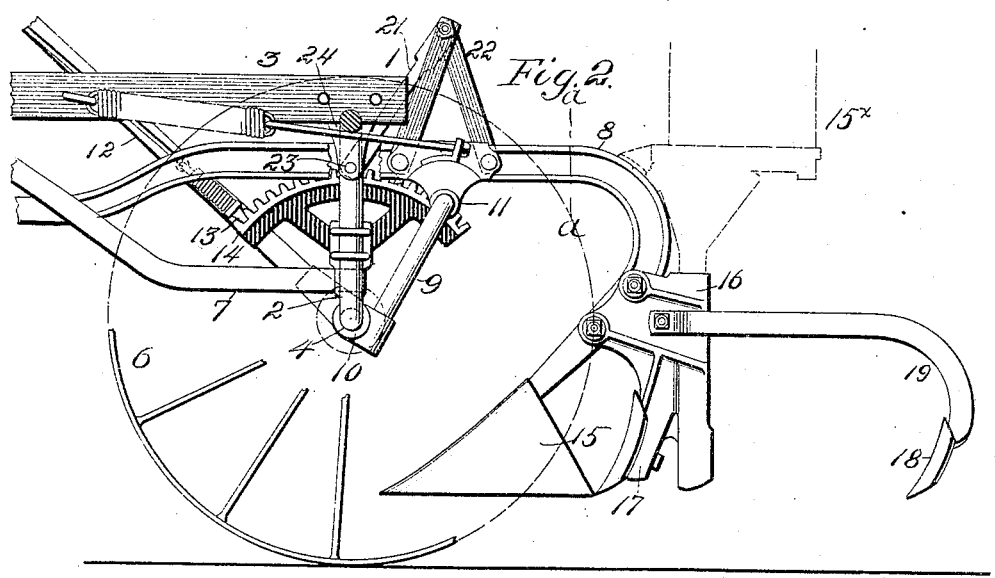

In the accompanying drawings, Figure 1 is a vertical longitudinal section through my improved machine with the parts adjusted for planting on a level. Fig. 2 is a similar view with the parts adjusted for planting on the top of a ridge. Fig. 3 is a similar view of the parts adjusted for planting in a trench. Fig. 4 is a vertical transverse section on the line *a a* of the preceding figures.

Referring to the drawings, 1 represents the frame of the machine, consisting of an arched axle 2, connected firmly with the rear end of a tongue 3 and formed with horizontal extensions 4, constituting wheeled spindles on which ground-wheels 6 are mounted, the said axle being further connected with and braced to the tongue by means of two draft-bars 7, bolted at their forward ends to the sides of the tongue and firmly connected at their rear ends to the vertical portions of the arched axle.

8 represents a fore-and-aft beam extending between the ground-wheels and connected with the frame of the machine through the medium of a bail 9, having the ends of its arms rigidly connected with sleeves 10, loosely encircling the horizontal extensions of the axle inward of the ground-wheels, whence the bail extends rearwardly and has its central horizontal portion journaled in a bearing 11, firmly bolted to the beam at a point about midway of its length, the arrangement being such that by the rocking or rotation of the sleeves on the extensions of the axle the rear end of the bail will be raised or lowered and will impart a corresponding bodily movement to the beam. The movement of the bail is effected by hand-lever 12, fixed at its lower end to one of the sleeves 10 and provided with a locking-latch 13, adapted to engage the teeth on a vertical segment-frame 14, firmly connected with the vertical portion of the arched axle, this mechanism enabling the operator occupying a seat on the rear end of the tongue to raise and lower the beam and lock the same at the desired elevation. At its rear end the beam carries at its lower extremity a furrow-opener 15 and in rear of the same a seed-hopper $15^\times$, provided in its bottom with a seed-discharge mechanism operated from one of the ground-wheels through the medium of a transmitting driving-shaft extending rearward and operatively connected with the seeding mechanism, and the seed from the hopper is discharged into the upper end of a vertical seed-tube 16, having its lower end terminating in rear of subsoiler 17, the seed discharged into the furrow being covered by two covering devices 18, in the form of covering-blades, fixed to the rear downwardly-curved ends of shanks 19, extending horizontally forward and sustained by the beam.

The foregoing parts may be of the usual and ordinary construction, and except as in so far as hereinafter indicated they in themselves form no part of the present invention.

In applying my invention I so connect the beam with the frame of the machine independent of the bail connection that when the beam is raised or lowered by the hand-lever it will be held in a horizontal position, or, in other words, its level will be maintained, so that under all conditions of planting, whether the seed is to be deposited on a ridge or in a trench or on a level, the beam will be held horizontal, the result being that the furrow-opener, the seed-spout, and covering devices will act at the same depth. The form of connection I prefer to adopt to effect this action comprises a horizontal link 21, pivoted at its rear end to the upper end of a standard 22, rising from the beam at a point vertically over the connection of the bail therewith, and having its forward end pivoted, as at 23, to the frame of the machine through the medium of a casting 24, depending from the under side of the tongue at its rear end, the relation of these parts to the bail being such as to form, in effect, a parallel connection between the beam and the frame of the machine, so that during the vertical movements of the beam the connection will maintain and hold the same in a truly horizontal position, thereby insuring the operation of the furrow-opener, seed-spout, and coverers at the same depth in the ground.

On reference to Fig. 1, where the parts are adjusted so as to plant on a level, the bail extends at a slight inclination upward, with the link 21 in a like position, while in Fig. 2, where the parts are adjusted to plant on high ground, the bail extends upward and rearwardly to a nearly vertical position, with the link also at the same inclination, while with the parts adjusted so as to plant in a trench the bail extends in a nearly horizontal position, with the link in a like position, the latter under all conditions occupying a position parallel with the bail and acting to so guide the beam that it is prevented from tipping and its horizontal position is maintained.

Having thus described my invention, what I claim is—

1. In a seeding-machine and in combination with a sustaining-frame, a fore-and-aft beam, a connecting member jointed at its forward end to the frame and at its rear end to the beam, and a second connecting member arranged parallel with the first and above the same and jointed at its ends respectively to the frame and beam, and means for raising and lowering the beam.

2. In a seeding-machine and in combination with a sustaining-frame, a fore-and-aft beam, a bail jointed to the frame and beam respectively, means for actuating said bail to raise and lower the beam, and a link connection between the frame and beam situated over the bail and adapted to maintain a parallel relation to the bail.

3. In a seeding-machine and in combination with a sustaining-frame, a fore-and-aft beam, and a parallel connection between the frame and beam, comprising two members arranged parallel to each other one above the other, and having each a jointed connection with the frame and beam respectively.

4. In a seeding-machine and in combination with a wheeled frame, a fore-and-aft beam, a bail having its forward end jointed to the frame and its rear end jointed to the beam, means for actuating said bail to raise and lower the beam, and a link having its rear end jointed to the beam at a point vertically over the connection of the bail therewith, and having its front end jointed to the frame at a point vertically over the connection of the bail therewith.

5. In a seeding-machine and in combination with a frame embodying an axle, ground-wheels mounted thereon, a fore-and-aft beam arranged between the ground-wheels, and a parallel connection between the beam and frame arranged wholly in rear of the axle.

6. In a seeding-machine and in combination with the frame comprising a tongue and an axle connected therewith, ground-wheels mounted on the axle, a bail having its forward end jointed to the axle and its rear end jointed to the beam, a standard on the beam, and a link jointed at its rear end to said standard and at its forward end to the tongue.

7. In a seeding-machine and in combination with a wheeled frame, a fore-and-aft beam, seed planting and covering devices sustained at the rear end of the beam, a bail jointed at its forward end to the frame and at its rear end to the beam, a standard rising from the beam vertically over the connection of the bail therewith, and a link pivoted at its rear end to said standard and at its forward end to the tongue at a point vertically over the connection of the bail with the frame.

In testimony whereof I hereunto set my hand, this 2d day of August, 1904, in the presence of two attesting witnesses.

AUGUST LINDGREN.

Witnesses:
L. C. BLANDING,
C. H. LIPPINCOTT.